UNITED STATES PATENT OFFICE.

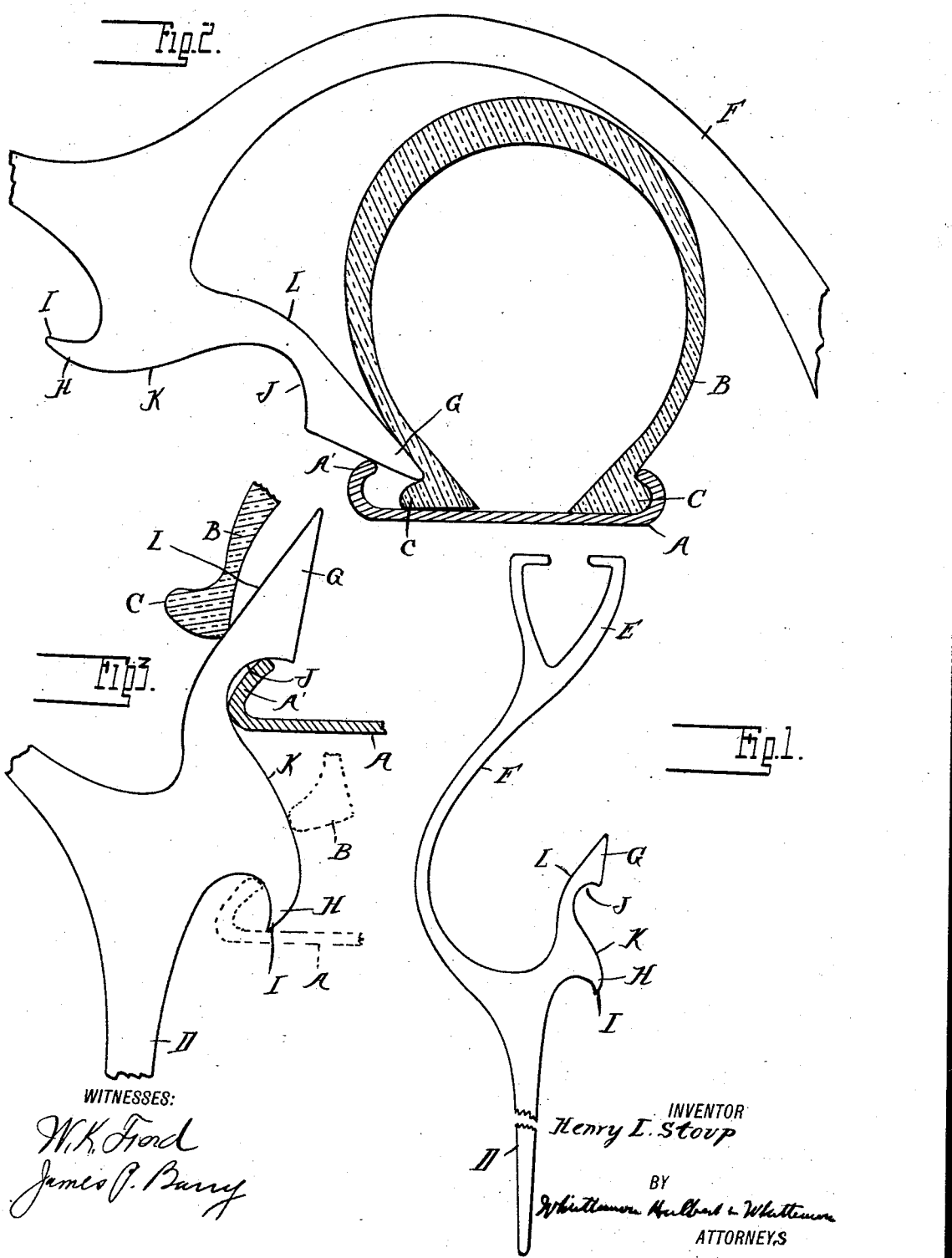

HENRY L. STOUP, OF YPSILANTI, MICHIGAN.

TIRE-TOOL.

1,175,189.   Specification of Letters Patent.   Patented Mar. 14, 1916.

Application filed January 4, 1915. Serial No. 422.

*To all whom it may concern:*

Be it known that I, HENRY L. STOUP, a citizen of the United States of America, residing at Ypsilanti, in the county of Washtenaw and State of Michigan, have invented certain new and useful Improvements in Tire-Tools, of which the following is a specification, reference being had therein to the accompanying drawings.

The invention relates to tire tools of that type in which the tire is alternatively engaged or disengaged from the rim by a plowing movement of the tool therearound.

It is the object of the present invention to obtain a construction of a single tool which is adapted for initially engaging the bead of the tire to remove the same from the rim; also to plow the bead from the rim, and further to engage and plow the bead upon the rim as hereinafter set forth.

In the drawings: Figure 1 is a side elevation of the tool; Fig. 2 is an enlarged view showing the tool in position for initial engagement with the tire to be removed from the rim; and Fig. 3 is a similar view showing in full lines the position of parts for plowing the bead off from the rim, and in dotted lines the position for plowing the bead upon the rim.

A is the rim of the vehicle wheel, of the usual clencher type, and B is the tire provided with the rim-engaging bead C. My improved tool comprises a lever D which is adapted to extend from a point of bearing upon the hub of the wheel to a point beyond the periphery of the wheel, where in the rotation of said wheel it will engage the ground. The ground-engaging portion is preferably bifurcated, as shown at E, to form separated bearing points which are disposed upon opposite sides of the central plane of the lever. Intermediate this ground-engaging portion and the inner end of the lever is a laterally-offset portion F, and upon the opposite side of this lateral offset is a projection forming the plowing-off point G and the plowing-on point H. These two portions G and H are arranged in substantial alinement with each other, the portion H having a hook I for engaging the inner face of the rim flange A', and the portion G having a recess J for receiving the rim flange. Respectively opposite the hook I and recess J are inclined portion L and K, which form the cams or deflecting faces for removing and replacing respectively the bead of the tire.

With the construction as described in operation if it is desired to remove the tire from the rim the point G is first inserted between the rim flange A' and bead C, as shown in Fig. 2. By thus using the lever D as a pry, a portion of the bead is elevated until the point G may be inserted thereunder. During this operation the lever is arranged in a substantially horizontal position and the lateral offset F provides clearance for passing over the tread of the tire without interference therewith. When the point G is slipped under the bead the lever is bent downward into parallelism with the plane of the wheel, so that the inner end may rest upon the hub. The wheel is then rotated until the portion E strikes the ground, which will arrest further movement of the lever, while the inertia of the wheel will continue its movement, causing the plowing of the bead. This action may be continued until the tire is removed. To reëngage the tire the hook I is engaged with the flange E' of the rim and the bead is placed against the inclined face K, as shown in dotted lines in Fig. 3. The lever is then moved relatively to the wheel, either by the same movement above described or by holding the wheel stationary and moving the lever, the result being that the bead is plowed into engagement with the flange of the rim.

I am aware that tools have heretofore formed with points for plowing on and plowing off the tire beads, and with ground-engaging and hub-engaging portions for assisting in this movement. My improved construction has, however, various advantages, such for instance, first, that a single tool is used for initially engaging the tire instead of requiring a separate tool for prying a portion of the bead out of the rim to engage the plow point; second, the laterally-offset portion provides clearance for the largest tire operated upon by the tool; and third, the plowing-off and plowing-on points are both placed upon the same side of the tool so as not to interfere with the clearance when the tool is used as a pry. The construction is also one which is easily manufactured.

What I claim as my invention is:—

1. A tire tool, bar, or lever of such size and proportion as to be capable of engaging the ground at one end and the hub of the wheel at the other, having an intermediate lateral projection shaped to serve as a plow and a pry, the body of the lever adjacent to such projection being offset from the longitudinal axis of the lever opposite said point sufficiently to span the tire and permit the use of the projection as a pry.

10. 2. A tire tool, bar, or lever of such size and proportion as to be capable of engaging the ground at one end and the hub of the wheel at the other, having an intermediate lateral projection shaped to serve as a plow and a pry, the body of the lever adjacent to such projection being offset from a line connecting its ends opposite said point sufficiently to span the tire and permit the use of the projection as a pry, one end of said lever spread in the same plane as the offset on both sides of the line of the extension of the lever beyond the offset.

In testimony whereof I affix my signature in presence of two witnesses.

HENRY L. STOUP.

Witnesses:
ESTELLE M. WRIGHT,
TRACY L. TOWNER.

Copies of this patent may be obtained for five cents each, by addressing the "Commissioner of Patents, Washington, D. C."